UNITED STATES PATENT OFFICE.

FRANK M. SLUTZ, OF KANSAS CITY, MISSOURI.

COMPOUND FOR PRESERVING MILK AND CREAM.

SPECIFICATION forming part of Letters Patent No. 250,294, dated November 29, 1881.

Application filed September 10, 1881. (No specimens.)

*To all whom it may concern:*

Be it known that I, FRANK M. SLUTZ, a citizen of the United States, residing at Kansas City, in the county of Jackson and State of Missouri, have invented certain new and useful Improvements in Compositions for Preserving Milk and Cream; and I do hereby declare the following to be a full, clear, and exact description of the invention, such as will enable others skilled in the art to which it appertains to make and use the same.

My invention relates to a new and useful composition for preserving milk and cream, whereby it will remain sweet and pure from thirty-six to forty-eight hours longer than will milk without the preservative added, and which composition will not affect any of the beneficial properties of the milk in the least. In boiling it does not separate, while it freezes better in the manufacture of ice-cream than milk without the composition.

My composition consists of the following ingredients, combined in about the proportions stated, viz: sixty grains baking-soda, eighty grains common salt, eight grains burnt sugar dissolved in small quantity of water, twenty grains cream-tartar, five grains of saltpeter dissolved in gill of water, one-half pound of good white sugar. Dissolve the above composition in pure water, and add to ten gallons sweet milk or cream.

In cities where milk is necessarily kept for a number of hours before delivery to customers, and is often shipped long distances to wholesale dealers, my improved composition will prove of great value, as it will enable the consumer to be furnished with pure sweet milk that may be kept over night.

My improved composition will have a tendency to drive out of the market "chalk and water" and injurious adulterations, by enabling large dealers to ship in pure milk from longer distances, and keep it sweet for a longer time.

In fresh, warm milk there is a great amount of animal heat, and on this account in warm weather milk "taints" or sours very quickly, and cannot be canned or put into closed vessels until after it is cooled. Experience has demonstrated that the cream-of-tartar has the effect of counteracting this tendency to taint, while the small quantity used will not coagulate the milk, and if it be added to the compound the compound may be put into the milk while it is yet warm, thereby obviating the necessity of artificially cooling the milk.

I am aware that a chemical preparation for preserving butter and meat consisting of the following ingredients: common salt, twelve parts; saltpeter, three parts; loaf-sugar, four parts; soda, one part; water, one hundred and thirty-seven parts, is old, and such I distinctly disclaim as not of my invention.

Having thus fully described my invention, I claim and desire to secure by Letters Patent—

The herein-described composition for preserving milk and cream, consisting of soda, common salt, burnt sugar, cream-tartar, saltpeter, and white sugar dissolved in water, substantially in about the proportions specified.

In testimony whereof I affix my signature in presence of two witnesses.

FRANK M. SLUTZ.

Witnesses:
JOHN W. BEEBE,
WM. B. TEASDALE.